United States Patent
Mizuta

(10) Patent No.: US 7,353,049 B2
(45) Date of Patent: Apr. 1, 2008

(54) FOLDABLE INFORMATION APPARATUS

(75) Inventor: Masatomo Mizuta, Tokyo (JP)

(73) Assignee: NEC Corporation (JP)

( * ) Notice: Subject to any disclaimer, the term of this patent is extended or adjusted under 35 U.S.C. 154(b) by 877 days.

(21) Appl. No.: 10/403,245

(22) Filed: Mar. 28, 2003

(65) Prior Publication Data

US 2004/0203532 A1    Oct. 14, 2004

(30) Foreign Application Priority Data

Mar. 29, 2002   (JP) ............................ 2002-096313

(51) Int. Cl.
   *H04M 1/00*   (2006.01)
(52) U.S. Cl. ............... 455/575.3; 455/575.4; 455/575.1; 455/550.1
(58) Field of Classification Search ............. 455/575.1, 455/575.3, 556.1, 556.2, 557, 550.1, 90.3, 455/566; 348/333.06, 14.02
See application file for complete search history.

(56) References Cited

U.S. PATENT DOCUMENTS

| | | | | |
|---|---|---|---|---|
| D427,172 S | * | 6/2000 | Bequir | D14/138 |
| 6,850,784 B2 | * | 2/2005 | SanGiovanni | 455/575.1 |
| 2001/0004269 A1 | * | 6/2001 | Shibata et al. | 348/333.06 |
| 2001/0034222 A1 | * | 10/2001 | Roustaei et al. | 455/403 |
| 2001/0036845 A1 | * | 11/2001 | Park | 455/566 |
| 2003/0017810 A1 | * | 1/2003 | Janninck et al. | 455/90 |
| 2003/0104789 A1 | * | 6/2003 | Torri et al. | 455/90 |

FOREIGN PATENT DOCUMENTS

| | | |
|---|---|---|
| CN | 1324169 A | 11/2001 |
| EP | 0 898 405 A2 | 2/1999 |
| JP | 6-224984 | 8/1994 |
| JP | 11-317797 | 11/1999 |
| JP | 2000-196720 | 7/2000 |
| JP | 2001-156893 A | 6/2001 |
| JP | 2001-169166 | 6/2001 |
| JP | 2001-186396 | 7/2001 |
| JP | 2001-320463 | 11/2001 |
| JP | 2002-64599 | 2/2002 |
| JP | 2003-18261 | 1/2003 |
| JP | 2003-18276 | 1/2003 |

OTHER PUBLICATIONS

Office Action issued by Chinese Patent Office in connection with corresponding application No. 03128640.2 dated Mar. 12, 2004 and English translation thereof.
Search Report from United Kingdom Patent Office dated Jun. 5, 2003 issued in connection with corresponding GB Patent Application No. 0307230.3.

(Continued)

*Primary Examiner*—Lewis West
(74) *Attorney, Agent, or Firm*—Ostrolenk, Faber, Gerb & Soffen, LLP

(57) ABSTRACT

A foldable information apparatus includes an upper unit having a display, a lower unit having operation keys, a biaxial hinge connecting the upper unit and the lower unit allowing the upper unit to be freely opened, closed, and rotated with respect to the lower unit, and an optical section provided on the top end portion of the biaxial hinge. The optical section includes at least one of a LED and a camera. The top end portion of the biaxial hinge is always exposed in the opened, closed and rotated states of the upper and lower units.

15 Claims, 6 Drawing Sheets

OTHER PUBLICATIONS

English translation of Abstract for Japanese Application No. JP2001-320463, Nov. 16, 2001.
English translation of Abstract for Japanese Application No. JP2003-182761, Nov. 17, 2003.
English translation of Abstract for Japanese Application No. JP2003-18261, Jan. 17, 2003.

Untranslated Office Action issued by Japanese Patent Office on Oct. 17, 2006 in connection with corresponding Japanese patent application No. 2002-096313.
English translation of relevant parts of Examiner's comments in Japanese Office Action, Oct. 17, 2006 submitted in lieu of statement of relevancy of prior art to present invention.

* cited by examiner

US 7,353,049 B2

FOLDABLE INFORMATION APPARATUS

BACKGROUND OF THE INVENTION

1. Field of the Invention

The present invention relates to a portable information apparatus which is foldable, such as portable telephone equipment or personal digital equipment, and in particular to a portable information apparatus equipped with an image capturing device and a visible alert device.

2. Description of the Related Art

There have been commercially available camera-equipped portable telephones, many of which have a foldable structure because it can be accommodated in compact. With such a trend, various types of camera-equipped portable equipment have been proposed.

For example, Japanese Patent Application Unexamined Publication No. 2001-186396 discloses a camera-equipped portable information terminal apparatus having a pair of units which are foldable by a hinge mounted with a camera. The camera is directed in a direction perpendicular to a rotation axis of the hinge.

The present applicant proposed a foldable portable information terminal having a new hinge structure (see U.S. patent application Ser. No. 10/259,509). Further, the present applicant proposed a foldable portable information terminal having the above new hinge structure and a camera mounted in the side of a lower unit (Japanese Patent Application No. 2002-036715 filed on Feb. 14, 2002).

On the other hand, a portable telephone is commonly provided with a visible alert device such as a light-emitting diode (LED) for informing a user to call arrival. In the case of a foldable-type portable telephone composed of a upper unit and a lower unit, plural LEDs are provided so as to be seen by a user when closed. Alternatively, a single LED may be provided on one end of the upper unit so as to be seen even if closed. However, such an arrangement does not provide good visibility. Especially, in regard to space-saving and cost-saving, providing plural LEDs is not preferable.

SUMMARY OF THE INVENTION

An object of the present invention is to provide a foldable portable information apparatus allowing easy operability and increased visibility of an optical section.

Another object of the present invention is to provide a foldable portable information apparatus allowing easy operability of a light-capturing section.

Still another object of the present invention is to provide a foldable portable information apparatus allowing increased visibility of a light-emitting section.

According to the present invention, a foldable portable information apparatus includes

DESCRIPTION OF THE PREFERRED EMBODIMENT

Figure 1A:
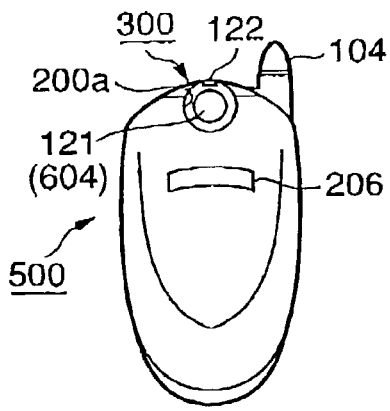
FIG. 1A is a top plan view of a portable telephone in a usually closed state according to an embodiment of the present invention.

As shown in FIGS. 1A-1E, a portable telephone 500 according to an embodiment of the present invention is composed mainly of three portions: a lower unit 100 having an operation section; an upper unit 200 having a display section 202; and a biaxial hinge section 300 as a movable connecting section (or a universal hinge section) that connects the lower unit 100 and the upper unit 200 so that they freely rotate and open/close.

As described later, the biaxial hinge section 300 has an optical section provided at the top surface thereof, the optical section including a light-receiving section (camera section) 121 and/or a light-emitting section (LED section) 122. The camera section 121 is equipped with a small-sized and slim camera such as a CCD (charge-coupled device) or CMOS image sensor.

The lower unit 100 and the upper unit 200 have flat and oval shapes having predetermined thickness and the approximately same size. The lower unit 100 and the upper unit 200 are mechanically connected via a biaxial hinge of the biaxial hinge section 300, which will be described in detail later. The upper unit 200 can rotate and open/close freely relative to the lower unit 100 around the biaxial hinge. The lower unit 100 and the upper unit 200 are electrically connected by an appropriate connection means such as FPC (flexible printed circuit) via the biaxial hinge section 300.

Figure 4:
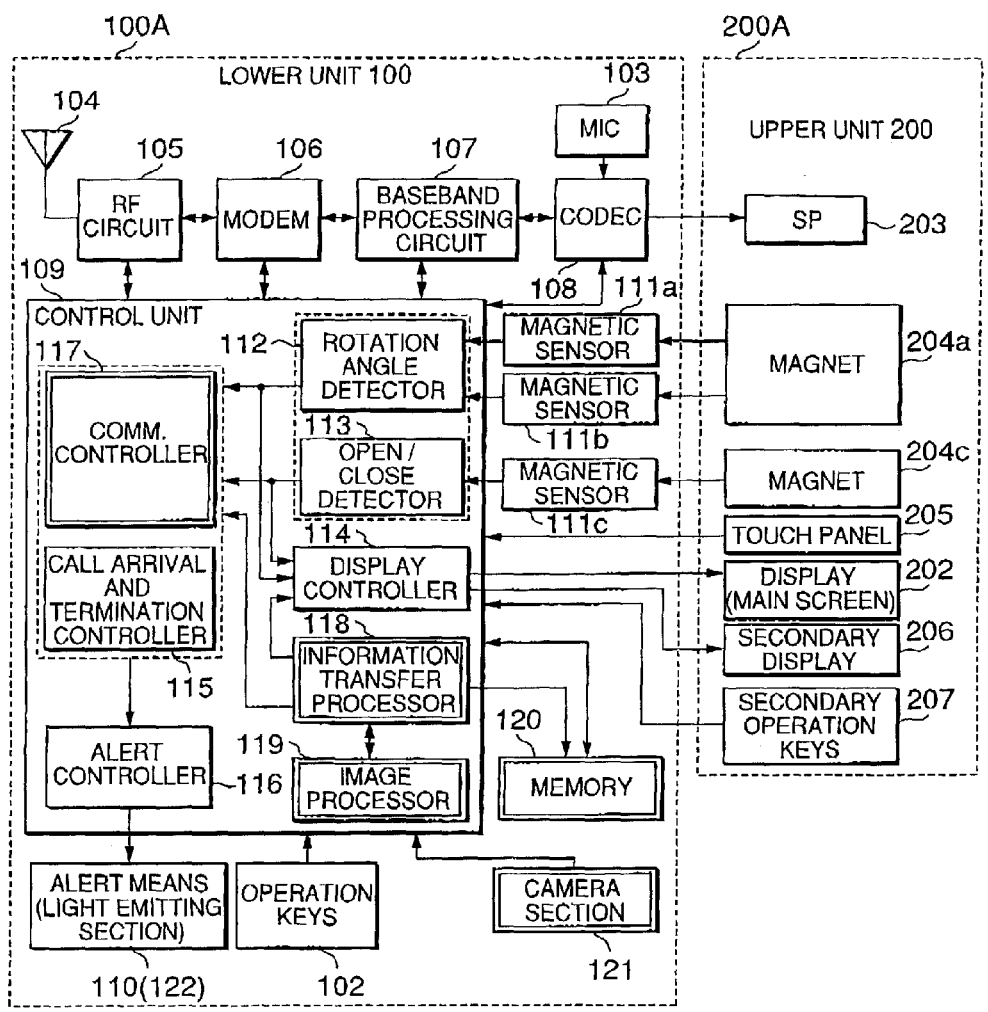
FIG. 4 is a schematic block diagram showing an electric circuit of the portable telephone according to the embodiment.

An external case 101 of the lower unit 100 accommodates various electronic circuits encircled with a broken line 100A of FIG. 4. An operation section is disposed on one surface (the operation surface) 101a of the lower until 100 and is composed of a plurality of operation keys which are used to perform various functions of the portable telephone 500. Further, an opening section for a microphone 103 is disposed at the front end of the same operation surface.

An external case 201 of the, upper unit 200 accommodates various electronic circuits encircled with a broken line 200A in FIG. 4. The display unit 202 having approximately a rectangular shape is disposed in vertical orientation on one surface (a display surface) of the upper unit 200. A speaker 203 is disposed at the front end. A small secondary display unit 206 is provided on the surface opposite to the display surface 201a.

The upper unit 200 and the lower unit 100 are connected by the biaxial hinge that is structured to include two orthogonal rotation axes that can rotate independently. As will be described later, the biaxial hinge allows the upper unit 200 to remove with respect to the lower unit 100 as shown in FIGS. 1A-1E.

Figure 1B:
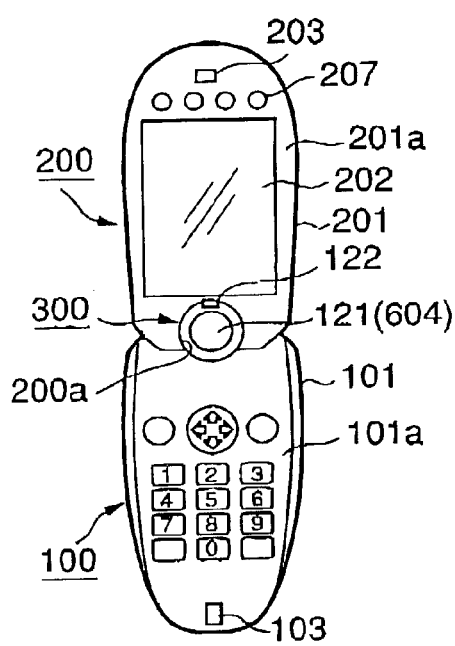
FIG. 1B is a top plan view of the portable telephone in an opened state according to the embodiment.
Figure 1C:
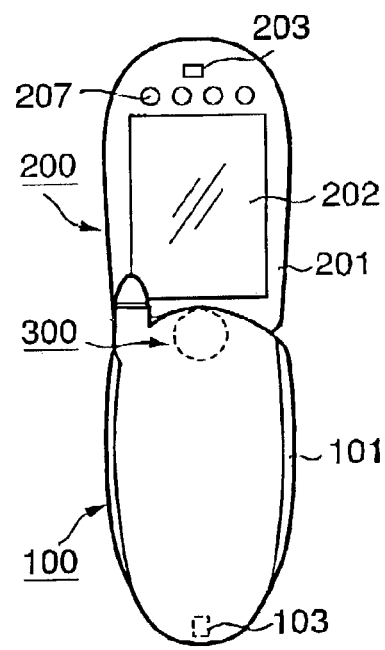
FIG. 1C is a bottom plan view of the portable telephone according to the embodiment in such a state that a upper unit is opened with its display-side surface facing backward.

The upper unit 200 has a cut-away portion 200a formed at the hinge-side end of the upper 200 so that the cut-away portion 200a provides a space for the biaxial hinge section 300 to freely open, close and rotate the upper unit 200 with respect to the lower until 100. Accordingly, the top to the biaxial hinge section 300 is exposed and can be seen by a user in the states as shown in FIGS. 1A-1E. More specifically, in the closed state as shown in FIG. 1A, the camera section 121 and the LED section 122 are exposed through the cut-away portion 200a of the upper unit 200. In the opened state as shown in FIG. 1B or in the state that the upper unit 200 is closed with its display-side surface facing outward as shown in FIG. 1E, the camera section 121 and the LED section 122 are also exposed through the cut-away portion 200a.

A recess portion is preferably formed in the hinge-side surfaces of the lower unit 100 and the upper unit 200 so that the upper unit 200 does not rub against the lower unit 100 when opened or closed.

Biaxial Hinge Section

Figure 2:
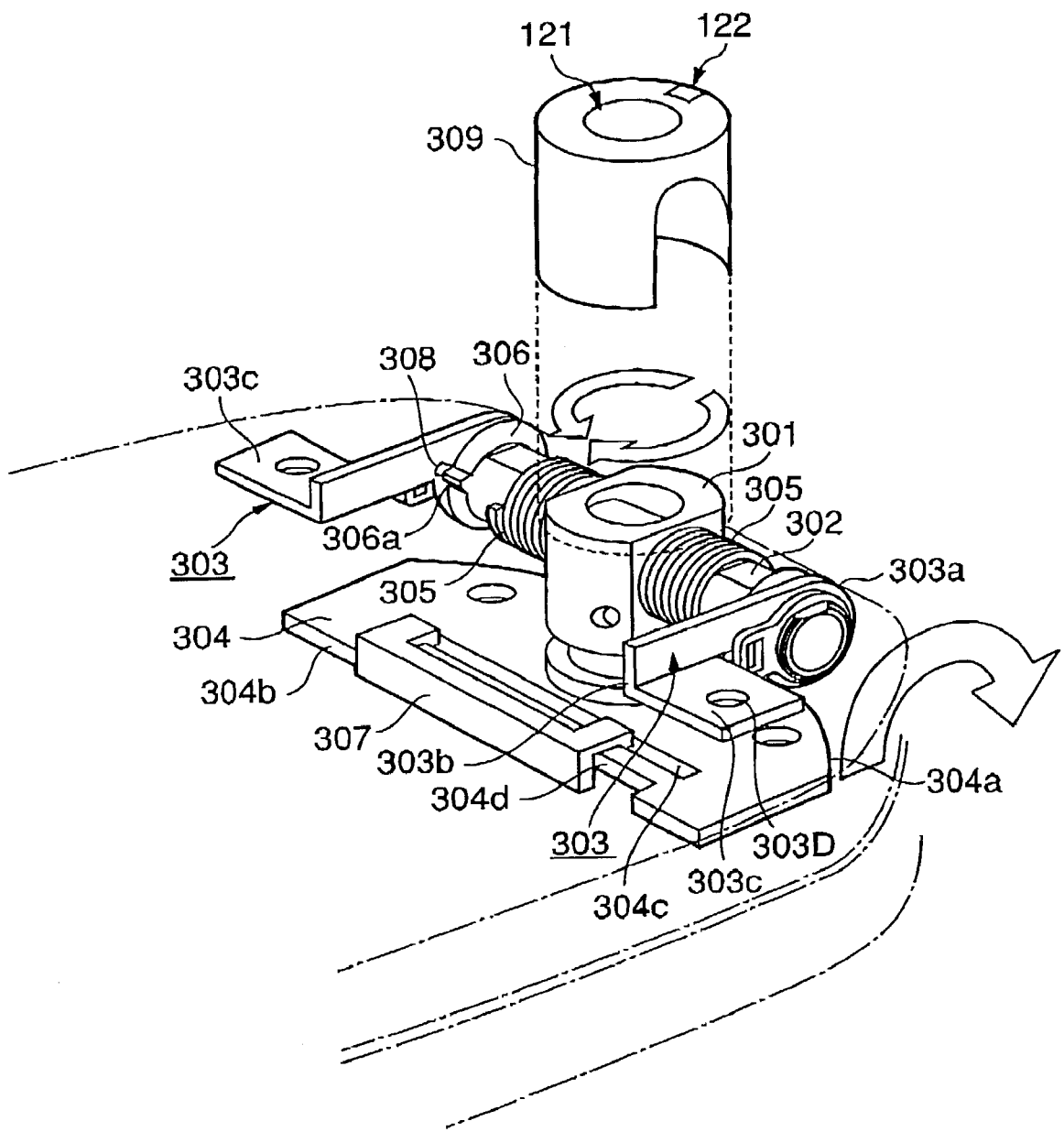
FIG. 2 is a perspective view of the main structure of a biaxial hinge and its vicinity used in the embodiment.

Referring to FIG. 2, the biaxial hinge section 300 is composed of the biaxial hinge and the optical section. The biaxial hinge has a first rotation axis (hereinafter, a horizontal rotation axis) 301 and a second rotation axis (hereinafter, an open/close rotation axis) 302. The optical section is composed of a cylindrical case 309 accommodating the camera section 121 and the LED section 122. The cylindrical case 309 is fixed to the horizontal rotation axis 301, wherein the optical axis of the camera section 121 is preferably in line with the center axis of the horizontal rotation axis 301.

The horizontal rotation axis 301 is rotatably supported to a base plate 304 which is fixed to the lower unit 100 from the inside. The horizontal rotation axis 301 protrudes perpendicularly from the lower unit operation surface. The open/close rotation axis 302 that is horizontal (parallel with the lower unit 100), pierces through the end portion of the horizontal rotation axis 301 at a right angle relative to the horizontal rotation axis 301, and is fixed rotatably.

The open/close rotation axis 302 has a coiled click plate spring 305 and a ring-shaped click plate 306 loosely and windingly engaged with each of axis portions extended to both sides thereof. A bracket 303 of an L-shaped metal plate is fixed to the front end of the extended axis portion at one end 303a thereof. The other end 303b of each bracket 303 is a fitting wing 303c that has its L-shaped leg bent at a right angle, which appears to extend horizontally in the drawing. The lower portion of the horizontal rotation axis 301, the open/close rotation axis 302, and the brackets 303, 303 are accommodated in the upper unit 200. Fitting holes 303d provided on the fitting wing 303c are used to fix the brackets 303, 303 to the upper unit 200 from the inside.

The horizontal rotation axis 301 and the open/close rotation axes 302 can rotate independently within a limited range. The base plate 304 is in approximately a rectangular shape, and one long side 304a is matched with a curve shape of a connection side end of the external case of the lower unit 100. A long guide hole 304c of a predetermined width and a predetermined length is formed at the center of the other long side with a constant distance from the other long side 304b of the base plate 304. The center portion of the long side 304b corresponding to the long guide hole 304c is cut away by a constant width. Such a structure forms a guide bar 304d having a rectangular shape at its cross section in the long side 304b. A horizontal rotation angle restricting stopper piece 307 is wound around this guide bar 304d so as to be slidable within a predetermined distance. A stopping claw (not shown) is formed at the center of the lower side of the horizontal rotation angle restricting stopper piece 307 protruding towards the horizontal rotation axis 301 side. Further details of the biaxial hinge are described in U.S. patent application Ser. No. 10/259,509.

Optical Section

Figure 3A:
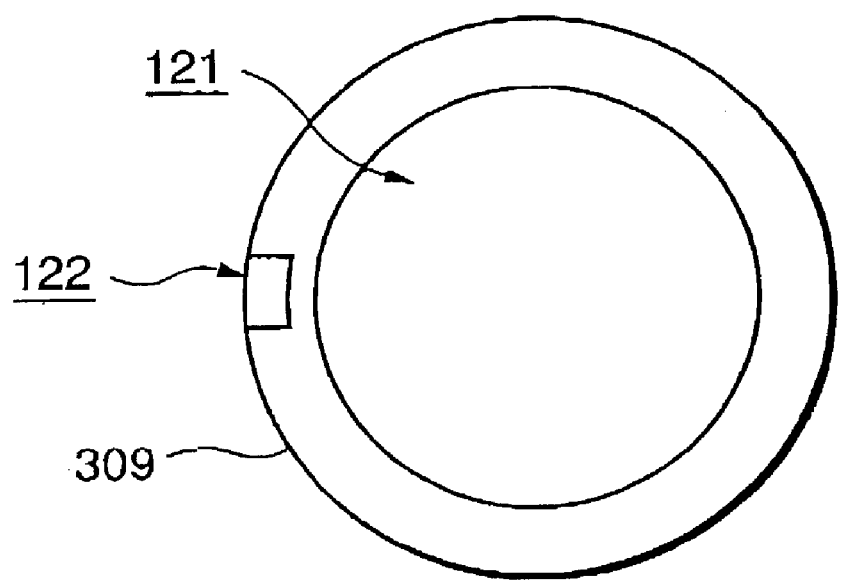
FIG. 3A is a top plan view of a cylindrical case as shown in FIG. 2.
Figure 3B:
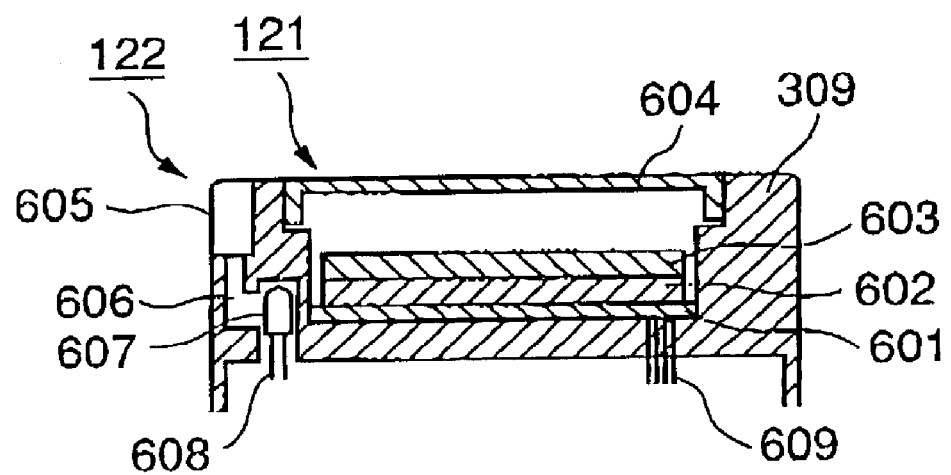
FIG. 3B is a side sectional view of the cylindrical case as shown in FIG. 3A.

As shown in FIGS. 3A and 3B, the optical section provided at the top of the biaxial hinge as shown in FIG. 2 is composed of the cylindrical case 309 accommodating the camera section 121 and the LED section 122. The cylindrical case 309 is fixed to the horizontal rotation axis 301. Alternatively, the horizontal rotation axis 301 and the cylindrical case 309 may be integrally formed as one piece.

Referring to FIG. 3B, the camera section 121 is composed of a printed circuit board 601, an image capturing devices 602, an optical lens 603, and an optically transparent and circular resin plate 604, which are accommodated within a hollow of the cylindrical case 309. The image capturing device 602 may be a CCD image sensor or a CMOS image sensor, which is connected on the printed circuit hoard 601 fixed on the bottom of the hollow of the cylindrical case 309. The optical lens 603 is mounted on the image capturing device 602 and forms an image thereon. The optically transparent resin plate 604 is provided as a window on the top surface of the cylindrical case 309 for protection of the optical lens 603.

The LED section 122 is composed of an optically transparent resin 605, a hollow space 606, and a light source 607, which are accommodated at a position in the side wall of the cylindrical case 309. The optically transparent resin 605 is embedded in the side wall of the cylindrical case 309. The light source 607 may be a LED, which is fixed within the hollow space 606. Light emitted from the LED is transmitted to the optically transparent resin 605 and therefore the light can be seen by the user with high visibility. In the case where the LED 607 is used as a visible alert to inform the user of call arrival, the user is easily made aware of call arrival because the top of the cylindrical case 309 is always exposed and can be seen by the user as shown in FIGS. 1A-1E.

As described above, the LED section 122 is provided on the top of the biaxial hinge section 300. Therefore, the visible alert of a single LED can easily catch the user's eye regardless of position relationship between the lower unit 100 and the upper unit 200.

The image capturing device 602 of the camera section 121 and the LED 607 of the LED section 122 are electrically connected to the lower unit 100 by FPC (flexible print circuit) connection wires 609 and 608, respectively. The captured image signal may be processed by an electronic circuit of the printed circuit board 601 before outputting to the lower unit 100 through the connection wires 609. The lower unit 100 is electrically connected to the upper unit 200, for example, by hollowing both the horizontal rotation axis and the open/close rotation axis and passing interconnection wires through the hollows. Alternatively, an FPC may be used to connect both ends to the lower unit 100 and the upper unit 200 in such a way that a film-shaped FPC is wound around both rotation axes.

Electronic Circuit

Next, an electronic circuit of the portable telephone according to the present embodiment will he described As shown in FIG. 4, the portable telephone according to the present embodiment is structured to include an antenna 104, an RF circuit 105, a modem 106, a baseband processing circuit 107, a codec circuit 10, a control unit 109, a microphone 103, operation keys 102, an alert means 110 (here, LED section 122), and three magnetic sensors 111a, 111b and 111c that are used to detect a position of the upper unit 200 (a posture relative to the lower unit 100).

Further, the portable telephone is provided with the camera section 121 for capturing still images or video images and a memory 120 for storing image information obtained by the camera section 121. These functional sections are mounted within the lower unit 100. A means for detecting a position of the upper unit 200 (a posture relative to the lower unit 100) is not restricted to the magnetic sensors (Hall elements). It is also possible to use a reed switch or a known mechanical switch, for example.

The control unit 109 includes a rotation angle detector 112 that decides a rotation angle of the upper unit 200 based on the output of each magnetic sensor 111, an open/close detector 113 that detects an open/close state including a front/back state, a display controller 114 that controls a direction of display contents so as to reflect outputs of the rotation angle detector 112 and the open/close detector 113, a call arrival and termination controller 115 that can carry out a call arrival control operation corresponding to the open/close and movement operation of the upper unit, and an alert controller 116 that can control a call arrival notification corresponding to the open/close and movement operation of the upper unit.

The RF circuit 105 has a receiving circuit, a transmitting circuit, and a frequency synthesizer, which are not shown. The operation keys 102 includes a transmission key, conversion keys for alphabet/Kana/Kanji/numeral, a power source on/off key, a cross key for cursor operation, and an end key.

Further, the portable telephone of the embodiment is structured to include a speaker 203, a magnet 204a corresponding to the magnetic sensors 111a and 111b, a magnet 204c corresponding to the magnetic sensor 111c, a display unit (a liquid crystal display: LCD) 202 that becomes a main screen, and a touch panel mechanism 205, a secondary display unit 206, and a secondary operation key 207, which are built in the surface of the display unit 202. The secondary operation key 207 includes a camera start key for operating the camera function of the camera section 121 and a image transmitting key for transmitting an image captured by the camera to the opposite party. These functional sections are mounted on the upper unit. The speaker 203 acts as a telephone receiver and also as an audible alert means.

These individual circuit parts that constitute the electric circuit may be conventional ones, and their detailed descriptions and functions will be omitted.

In the portable telephone 500 according to the present embodiment having the two units 100 and 200 connected with the biaxial hinge section 300, the upper unit 200 can be opened and closed relative to the lower unit by rotating around the second rotation axis 302, and can rotate around the first rotation axis 301 relative to the lower unit 100. Therefore, although front and back surface direction of the upper unit 200 is limited to a direction parallel with the second rotation axis 302, the upper unit 200 can pivot around the position of the first rotation axis 301 to an arbitrary position or one surface side of the lower unit 100. Further, it is also possible to turn upside down on the same position. In other words, the lower unit 100 and the upper unit 200 can take various relative postures as demanded. At one of the predetermined stop positions, it is possible to hold a relative posture with the horizontal rotation axis restricting means and the click mechanism.

Position Detection

As described above, the magnetic sensors 111a, 111b and 111c and the magnets 204 cooperate to detect a relative position between the lower unit 100 and the upper unit 200. Installation positions of the magnetic sensors 111 and the magnets 204 will be described in detail.

Figure 5A:
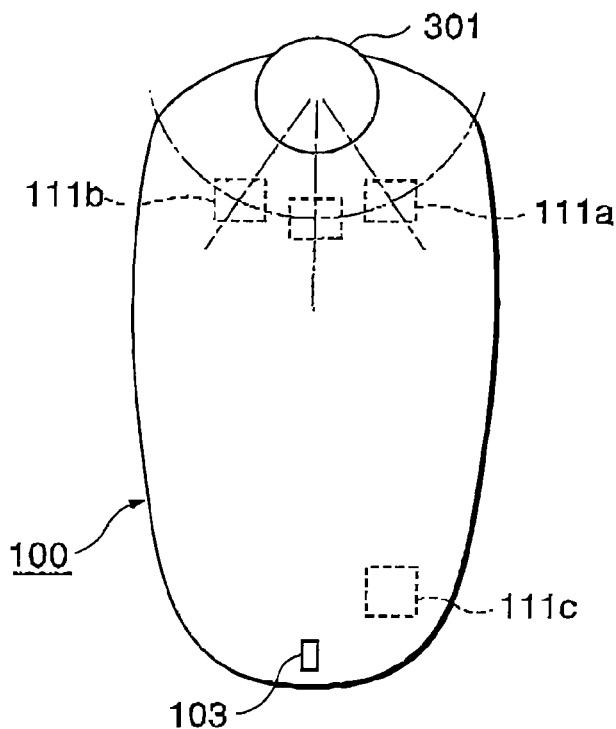
FIGS. 5A and 5B are schematic top plan views for explanation of the layout of magnetic sensors and magnets in the portable telephone according to the embodiment.

As shown in FIG. 5A, three Hall elements (magnetic sensors) 111a-111d are disposed inside the lower unit 100 with the sensitive sides of the sensors facing the operation surface side. The two Hall elements 111a and 111b are disposed on the circumference of a predetermined radius around the horizontal rotation axis 301 and on two radius lines that each form an angle at 45° with respect to a long axis of the lower unit to form a central angle of 90° in the drawing. The third Hall element 111c is disposed at a position shifting to one side in the front end of the lower unit. Each Hall element can detect the direction of magnetic field generated by a magnet.

Figure 5B:
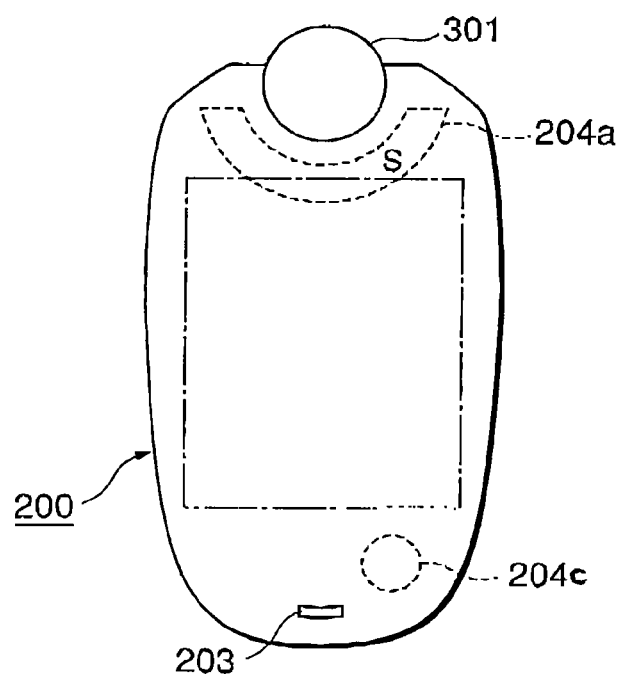

On the other hand, as shown in FIG. 5B, the magnet 204a that has a semicircle shape and is magnetized in a thickness direction in the drawing is fitted along the circumference of the predetermined radius around the first rotation axis 301 inside the upper unit 200. Further, the magnet 204c is provided at a position corresponding to the Hall element 111c in the front end of the upper unit.

The magnetic sensors 111 may be disposed on the upper unit 200, and the magnets 204 may be disposed on the lower unit 100. It is essential that one of the magnetic sensor and the magnet forming a pair is disposed on the upper unit and the other is disposed on the lower unit. It is not always necessary to use a semicircle magnet, and separate magnets may be disposed at corresponding positions of the Hall elements 111a and 111b.

Figure 6:
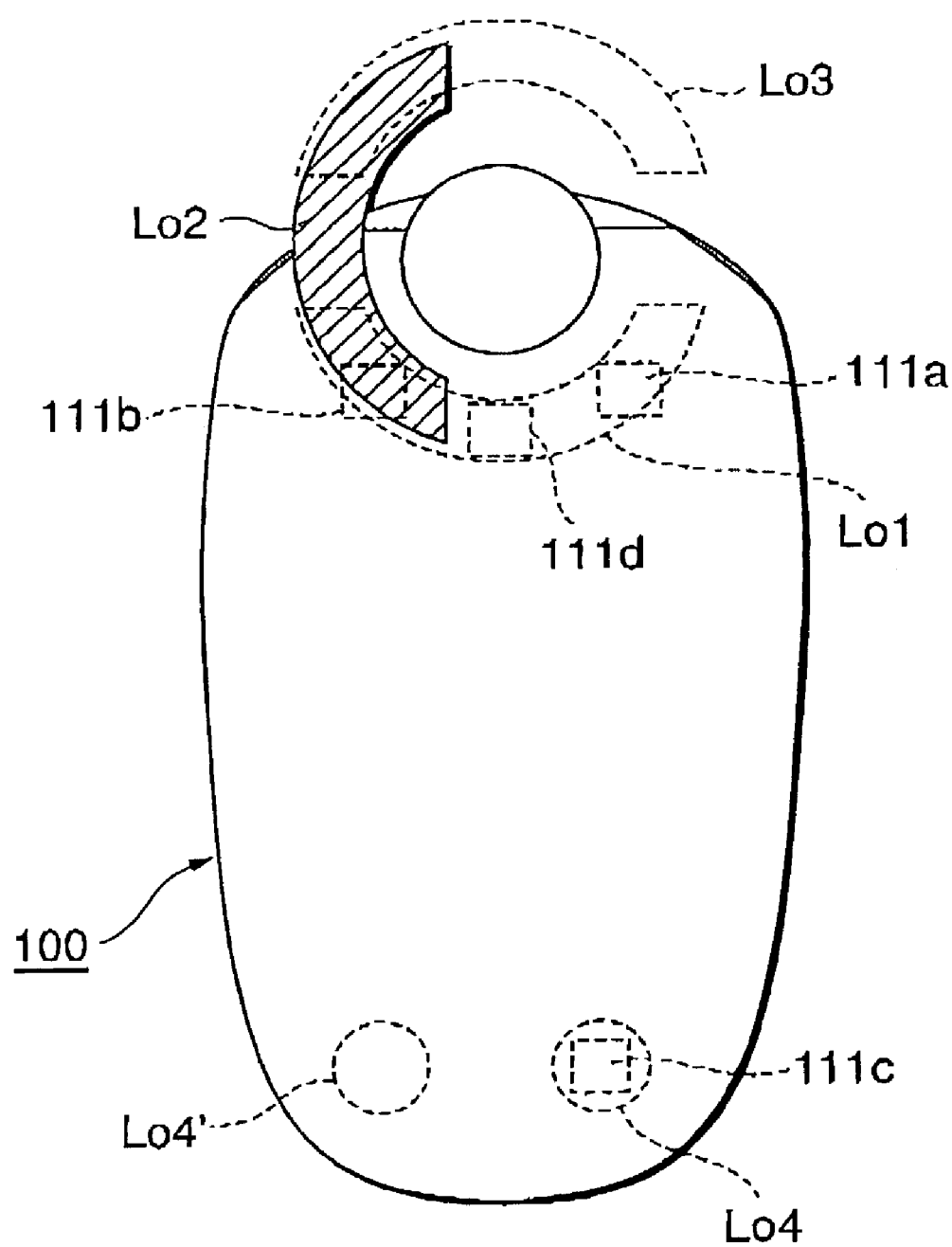
FIG. 6 is an explanatory view showing positions of magnets corresponding to Hall elements of a lower unit in respective ones of main rotation positions of an upper unit.

As shown in FIG. 6, Lo1 indicates position of the magnet 204a and Lo4 indicates a position of the magnet 204c in the case where both units are folded with the display surface exposed to the outside. In this state, the respective Hall elements 111a, 111b, and 111c generate outputs and therefore a current state (position) of the upper unit can be determined based on the outputs from the rotation angle detector 112 and the open/close detector 113.

Lo2 indicates a position of the magnet 204a when rotated by 90° in a clockwise direction in the drawing. In this case, only the Hall element 111b generates an output and thereby a state (position) of the upper unit can be determined. Lo3 indicates a position of the magnet 204a when further rotated by 90° in the clockwise direction in the drawing (a normal communication position). In this case, no output is obtained from any one the Hall elements. Therefore, it is possible to decide a state (position) of the upper unit.

When both units are folded with the display surface facing inside, the position of the magnet 204a also becomes Lo1 (the direction of the magnetic field becomes opposite in case of FIG. 5). However, since the position of the magnet 204c becomes Lo4' which does not coincide with the Hall element 111c, it is possible to determine that both units are in the folded state with the display surface facing inside.

Operation

As described before, the LED 607 is used as a visible alert to inform the user of call arrival, the user is easily made aware of call arrival because the top of the cylindrical case 309

As described above, the top surface of the biaxial hinge section 300 provided with the camera section 121 and the LED section 122 is always exposed and can be seen by the user regardless of position relationship between the lower unit 100 and the upper unit 200 as shown in FIGS. 1A-1E. In other words, the camera section 121 and the LED section 122 are always directed in the same direction as the surface of the lower unit 100 regardless of how the upper unit 200 is positioned with respect to the lower unit 100. Accordingly, the camera section 121 can capture a picture in the side of the surface of the lower unit 100 as long as the upper unit 200 is approximately parallel to the lower unit 100 as shown in FIGS. 1B-1E.

Figure 1D:
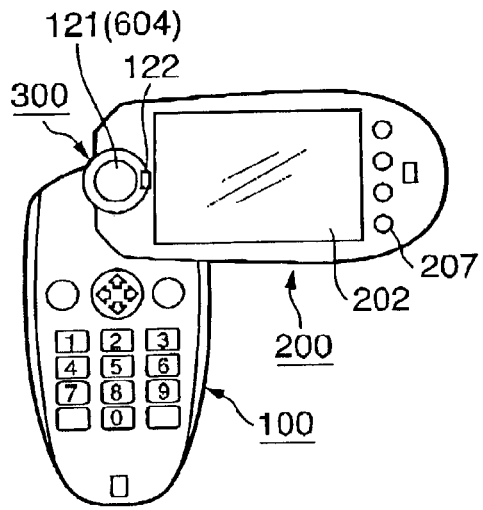
FIG. 1D is a top plan view of the portable telephone showing a main stop position (relative posture) of a lower unit and an upper unit according to the embodiment.
Figure 1E:
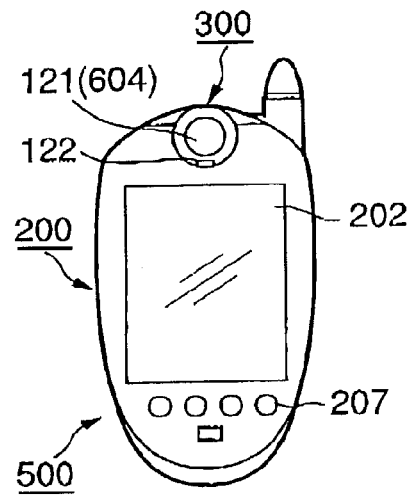
FIG. 1E is a top plan view of the portable telephone according to the embodiment in such a state that a upper unit is closed with its display-side surface facing outward.

In the case of FIGS. 1B, 1D and 1E, an image of the user now operating the portable telephone can be captured and displayed on the display 202. In the case of FIG. 1C, an image of the subject over there can be captured while seeing the image displayed on the display 202.

More specifically, in the case of FIG. 1B, the user operates a predetermined one of the secondary operation keys 207 or the operation keys 102 to capture an image of the user by the camera section 121. The image data captured by the camera section 121 is transferred to the display controller 114 through the information transfer processor 118 and is displayed on the display section 202. The user may operate a predetermined one of the secondary operation keys 207 or the operation keys 102 to store the image data into the memory 120. In this manner, the user's image can be displayed and recorded. Further, the image data stored in the memory 120 can be transmitted through the communication controller 117 depending on user's instruction.

In the case of the camera section 121 being a video camera, an image is captured by the camera section 121 and voice is captured by the microphone 103 to produce a video signal. The video signal is transmitted through the communication controller 117 and, when receiving a video signal from the other party, the received image may be displayed together with the user's image on the screen of the display section 202 and the received voice is reproduced by the speaker 203. This achieves videophone communication.

Similarly, in the case of FIG. 1C, an image of the subject over there can be captured, recorded, or transmitted while seeing the image displayed on the display 202.

According to the present embodiment, the camera function can be used in the case of FIG. 1D. When the upper unit 200 is rotated to a horizontally oriented position, the camera section 121 fixed to the horizontal rotation axis 301 (see FIG. 2) is also rotated. Accordingly, the user's image can be displayed in a horizontally oriented position on the display section 202. Such a horizontally oriented image is electronically rotated by 90 degrees into a vertically oriented image before being transmitted.

According to the present embodiment, the camera function can be used in the case of FIG. 1E. In this case, the camera section 121 is upside down and therefore the direction of the captured image is converted by the image processor 119 before displaying and recording. The user can operate a predetermined one of the secondary operation keys 207 to store the user's image into the memory 120 while seeing it on the display section 202.

As described above, the camera section 121 is fixed to the top of the biaxial hinge section 300 and its line of vision is the same direction of the normal to the operation-key surface of the lower unit 100. Since the cut-away portion 200*a* is formed in the upper unit 200 around the biaxial hinge section 300, the camera section 121 is always exposed outward and thereby the user easily captures an image of the user or the subject over there with only one camera by changing the direction of the upper unit 200. Since only one camera is needed to capture an image of the user or the subject over there, cost reduction is achieved. Since there is no need of mechanical means for changing the camera itself, reliability is enhanced. In addition, since the LED section 122 is also provided on the top of the biaxial hinge section 300, the user is reliably informed of call arrival or the like.

It is possible to provide only the LED section 122 on the top of the biaxial hinge section 300. In such a case, the LED section 122 may be provided at the center of the top surface of the biaxial hinge section 300. Similarly, it is possible to provide only the camera section 121 on the top of the biaxial hinge Section 300.

The camera section 121 may be provided with tilt mechanism, optical telephoto mechanism and/or image enlarging mechanism for enhanced convenience.

The present invention has been explained with reference to the embodiments. However, the present invention is not limited to these embodiments, and it is also possible to implement the present invention in various modes. For example, the biaxial hinge section 300 may be designed in a structure different from the above-described embodiment. It is essential that the connecting member can connect the upper unit to the lower unit so that the upper unit can be freely rotated, opened and closed with the optical section on the top thereof being always seen. Other members may be modified within the technical scope of the present invention.

For example, the display unit is not limited to an LCD, and may use an electro luminescent (EL). Further, operation buttons may be provided on the side surface of the upper unit as a secondary operation section. When the units are closed with the display unit facing in, the displaying and the backlighting (if it is a backlit LCD) preferably stop for energy saving.

Although the present invention has been explained taking a portable telephone as embodiments, the present invention is not limited to the portable telephone. It is also possible to apply the present invention to a foldable information terminal such as a PDA (personal digital assistant), provided that the operation section and the display section are separated and foldable, which can achieve similar operations and effects as described above.

The invention claimed is:

1. A foldable information apparatus comprising:
a first unit having a side with a display section;
a second unit having a side with an operation section;
a movable connecting mechanism connecting the first unit and the second unit so as to allow the first unit to be freely opened, closed and rotated with respect to the second unit while exposing a top surface of the movable connecting mechanism, the rotation of the first unit with respect to the second unit being in planes parallel to planes in which the second unit is located; and
an optical section provided on the top surface of the movable connecting mechanism, the optical section comprising a camera having an optical axis extending to the same side of said second unit as said operating section side of the second unit.

2. The foldable information apparatus according to claim 1, wherein the optical section further comprises a light-emitting section.

3. The foldable information apparatus according to claim 1, wherein the movable connecting mechanism is a biaxial hinge which connects the first unit to the second unit so that the first unit is allowed to be opened and closed and rotated freely,
   wherein the biaxial hinge comprises:
      a first rotation axis securely and rotatably provided on an operation surface of the second unit in vicinity of one end thereof, the first rotation axis protruding approximately vertically from the operation surface; and
      a second rotation axis orthogonal to the first rotation axis and provided in vicinity of a front end of the first rotation axis to axially and rotatably support the first unit,
   wherein the optical section is fixed to the top surface of the first rotation axis.

4. A foldable information apparatus comprising:
   a first unit having a side with a display section;
   a second unit having a side with an operation section;
   a biaxial hinge for connecting the first unit and the second unit so that the first unit and the second unit are relatively rotated on a first rotation axis, the relative rotation of the first and second unit being such that the relative rotation occurs in parallel planes, and freely opened and closed on a second rotation axis, wherein a top surface at an end of the first rotation axis is exposed in at least an open state, a closed state and a rotated state; and
   an optical section provided on the top surface.

5. The foldable information apparatus according to claim 4, wherein the first unit has a cut-away portion formed corresponding to the top surface so that the top surface is not covered with the first unit.

6. The foldable information apparatus according to claim 4, wherein the optical section comprises a case accommodating at least one of a light-emitting section or a camera section.

7. The foldable information apparatus according to claim 6, wherein the light-emitting section comprises:
   a light-emitting device for emitting light; and
   an optically transparent section exposed on an outer top surface of the case, for transmitting the light outward.

8. The foldable information apparatus according to claim 6, wherein the camera section comprises:
   an image capturing device;
   an image forming lens for forming an image on the image capturing device; and
   an optically transparent plate exposed on an outer top surface of the case, for receiving outside light to transmit it to the image forming lens.

9. The foldable information apparatus according to claim 8, wherein an optical axis of the camera section extends in a direction of the first rotation axis.

10. The foldable information apparatus according to claim 6, wherein the case accommodates the light-emitting section and the camera section, wherein a light receiving portion of the camera section is provided at a center of a top surface of the case and a light emitting portion of the light-emitting section is provided off-center on the top surface of the case.

11. The foldable information apparatus according to claim 6, wherein the first unit further comprises a secondary operation section on the side thereof, wherein the secondary operation section is used to operate the camera section.

12. The foldable information apparatus according to claim 6, wherein the case accommodating the camera section is rotated synchronous with rotation of the first unit.

13. The foldable information apparatus according to claim 12, wherein, when the first unit and the second unit are relatively rotated to form an angle of 90 degrees, a horizontally oriented image captured by the camera section is displayed on the display section that is horizontally oriented.

14. The foldable information apparatus according to claim 13, wherein the horizontally oriented image is converted into a vertically oriented image before being stored into a memory.

15. The foldable information apparatus according to claim 13, wherein the horizontally oriented image is converted into a vertically oriented image before being transmitted.

* * * * *